Nov. 19, 1968   J. S. MACHADO ET AL   3,411,539
PNEUMATIC VALVE
Filed July 30, 1965   3 Sheets-Sheet 1

INVENTOR.
John S. Machado
BY
Roberts, Cushman & Grover
ATTORNEYS

United States Patent Office 3,411,539
Patented Nov. 19, 1968

3,411,539
PNEUMATIC VALVE
John S. Machado, Woburn, and Nicholas L. De Meo, Medford, Mass., assignors to United Electric Controls Company, Watertown, Mass., a corporation of Massachusetts
Filed July 30, 1965, Ser. No. 475,993
2 Claims. (Cl. 137—627.5)

ABSTRACT OF THE DISCLOSURE

A refrigeration valve contianing inlet, outlet and exhaust passages and a valve and valve actuator movable in response to a rise in temperature in a refrigeration chamber to supply refrigerant to the chamber until a predetermined low temperature is reached and then to shut off the refrigerant and connect the chamber to the atmosphere.

---

The conventional refrigerator car or truck is refrigerated by cooling coils mounted in or on the walls of the vehicle through which a refrigerant is pumped by a thermostatically controlled motor. Equipment of this kind is not wholly reliable, uses up storage space, adds weight to the vehicle and wears out rapidly. The disadvantages of such a system of refrigeration are avoided herein by employing a compressed refrigerating gas which is metered into the chamber to be refrigerated and is exhausted therefrom when it is used up and the principal objects of this invention are to provide a miniature, extremely compact metering valve for automatically metering the gas as it is required to maintain a predetermined level of refrigeration and to exhaust the used gas when it has served its purpose; to provide a valve which is reliable; to provide a valve which is non-bleeding; to provide a valve which is vibration-proof; to provide a valve which is direct-acting and optionally reverse-acting; and to provide a valve which is durable, corrosion-resistant, inexpensive to manufacture and easy to repair.

As herein illustrated, the valve comprises a valve body containing an internal chamber having portions of different diameter arranged tandemly with an annular valve seat between them and constituting, respectively, a valve chamber and a valve actuator chamber. There is an inlet in communication with the valve chamber, an outlet and an exhaust in communication with the valve actuator chamber, a valve seated in the valve chamber, means yieldably pressing the valve against the valve seat, a valve actuator in the valve actuator chamber, and yieldable means mounted between the valve and valve actuator yieldably urging the valve and the valve actuator away from each other. The valve actuator has a part protruding from the body movable by pressure applied thereto to a position of engagement of its inner end with the valve and in opposition to the yieldable means to lift the valve from its seat. Lifting of the valve from its seat places the inlet and outlet in communication and blocks communication between the inlet and exhaust and the outlet and the exhaust. The means holding the valve on the valve seat is a spring and the valve actuator comprises a rod on which there is a piston located between the two passages entering the valve actuator chamber. The rod contains an axial passage extending from its inner end axially beyond its piston with one end in communication with the actuator chamber at one side of the piston and the other with the actuator chamber at the other side of the piston, and a spring normally holds the valve actuator with its inner end spaced from the valve such that the two passages in the valve actuator chamber are in communication by way of the axial passage in the rod. The rod contains a lateral passage extending from the axial passage in it into the actuator chamber at the opposite side of the piston. The piston is constituted by axially spaced annular shoulders on the rod and a yieldable O-ring disposed on the rod between the shoulders. An additional annular shoulder on the rod adjacent the bottom of the actuator chamber and an annular O-ring mounted on the rod between the shoulder and the bottom of the actuator chamber operate yieldably to limit movement of the rod in a direction away from the valve. The spring on the rod which holds the rod spaced from the valve is of lesser resistance to compression than the spring which holds the valve against the valve seat. Optionally, the exhaust passage in the body may be omitted and the axial passage in the rod extended into the portion projecting from the valve actuator chamber so as to intersect a diametrical passage into the protruding end which is open to the atmosphere. In this form, the piston is omitted and there are only two axially spaced flanges, the upper one of which supports the spring and the lower one of which engages the O-ring.

The invention will now be described in greater detail with reference to the accompanying drawings wherein.

Figure 1:
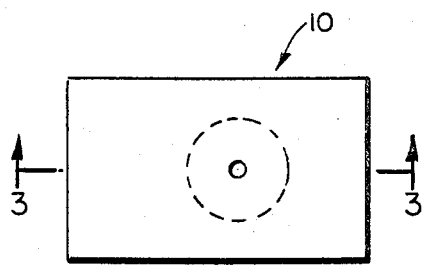
FIG. 1 is a top view of the valve.
Figure 2:
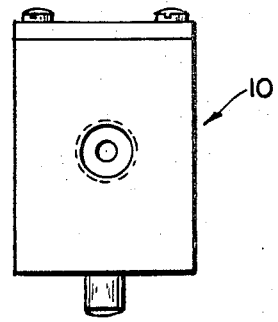
FIG. 2 is an elevation as seen from one end of the valve.

Referring to the drawings, the valve comprises a block 10 containing a pair of axially aligned chambers 12 and 14 of different diameter (FIG. 3), the chamber 12 having an opening at the top corresponding in diameter thereto and the chamber 14 having an opening 16 at the bottom of smaller diameter than the chamber 14. At the junction of the bottom of the chamber 12 with the top of the chamber 14, there is an annular flange 18, the inside diameter of which corresponds to the diameter of the chamber 14 and the outside diameter of which is smaller than the inside diameter of the chamber 12, so as to provide an annular end face 20 which constitutes a valve seat between the chambers 12 and 14. A valve member 22 is mounted in the chamber 12 and is retained therein by a cover plate 24 fastened by screw bolts 26 over the opening at the top of the block. To provide a seal the top of the block has a groove 21 concentric with the opening in which there is positioned a resilient sealing ring 23.

The lower face of the valve member 22 has a flat face surrounded by an annular flange 30 containing an inner reentrant groove 32 for receiving the peripheral edge of a flat yieldable gasket 34 and for holding the gasket flat against the face 28. The valve member 22 corresponds in cross-sectional configuration to the chamber 12 but is somewhat smaller so that it is free to move axially within the chamber relative to the valve seat and is yieldably held against the seat by a coiled compression spring 36 mounted in a hole 38 formed in the valve member 22 with one end bearing against a washer 40 seated at the bottom of the hole and the other end bearing against the underside of the cover plate 24. To prevent the air within the hole 38 from cushioning the movement of the valve member 22 and thus making it sluggish, a vent hole 42 is provided in the cover plate 24 to allow the air to escape freely or to re-enter the hole as it moves. To prevent escape of the fluid being metered through the vent hole the upper end of the valve member 22 is turned down to provide a short neck 44 surrounding the hole 38 and a yieldable O-ring 46 is mounted about the neck to seal the chamber from the vent 42.

A valve actuator is mounted in the chamber 14 which comprises a rod 48, a portion of which is movable axially in the chamber relative to the valve member 22 and which has a part 50 extending through the opening 16 by means of which it may be forced inwardly toward the valve member 22 to engage its inner end 52 with the valve member 22 and thereby lift the valve member 22 from its seat. The rod 48 has on it a pair of axially spaced flanges 54 and 56, the purpose of which will appear hereinafter, and a coiled spring 60 is mounted on the rod above the flange 54 with its lower end engaged with the flange 54 and its upper end engaged with the lower face of the valve member 22. The spring 60 normally operates to hold the actuator away from the valve member so that the upper end 52 of the rod is spaced from the valve member. A flange 62 on the rod adjacent the bottom of the chamber 14 provides for limiting movement of the rod away from the valve member by contact with a yieldable O-ring 64 mounted on the rod between the flange 62 and the bottom of the chamber 14.

The chamber 12 contains an inlet passage 66 and the chamber 14 contains outlet and exhaust passages 68 and 70 axially displaced relative to each other. Each of the passages is provided with threaded entrances of larger diameter 72, 74 and 76, respectively, for receiving the threaded nipples of conductor members by means of which the refrigerant gas is supplied from a source, delivered into the refrigerating space and exhausted therefrom.

Figure 3:
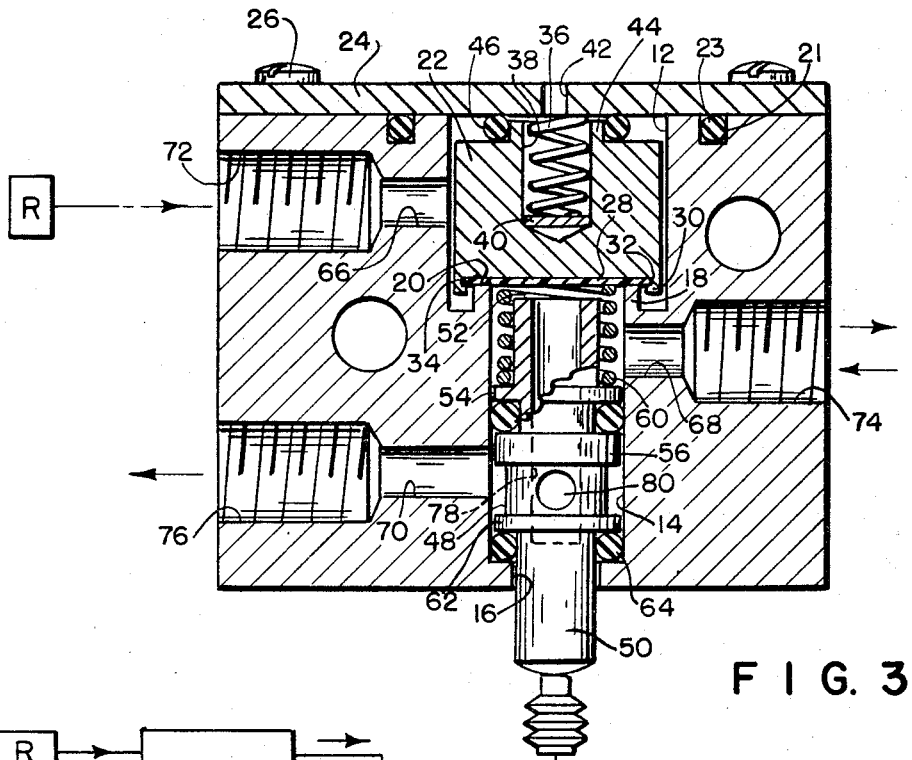
FIG. 3 is a vertical section taken on the line 3—3 of FIG. 1, showing the valve used in a direct-acting capacity with the valve inlet closed.
Figure 3A:
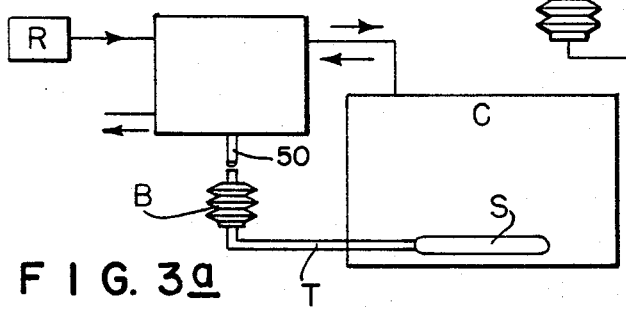
FIG. 3a is a block diagram of a refrigerating system embodying the valve.

FIG. 3a is a block diagram showing the inlet of the valve connected to a source of refrigerant R, the outlet to the top of a refrigerating chamber C, a sensing device S in the form of a bulb containing a volatile fluid and a bellows B connected by a capillary tube T to the sensing bulb and operable by expansion to effect movement of the rod 50 of the valve.

As shown in FIG. 3 the valve member 22 is in a closed position, the rod 50 being held away from the valve member 22 by the spring 60 and the valve being held against the seat by the spring 36 which is the stronger of the two springs. In this position the refrigerant from the source R is permitted to flow into the chamber 12 but cannot flow beyond this chamber because the valve member 22 is seated firmly on the valve seat 20. In this position of the valve the upper end of the valve actuator 50 is spaced from the valve so that the interior of the refrigeration chamber is connected directly through the outlet passage 68 to the exhaust passage 70 by an axial passage 78 extending from the upper end of the rod 50 toward its lower end and a lateral passage 80 extending from the passage 78 through the side of the rod. Assuming that the refrigeration chamber was under refrigeration but that the temperature within the chamber is rising to a level above that desired for maintaining proper refrigeration, the sensing device S will effect expansion of the bellows B and push the rod 50 inwardly so that its upper end engages the valve member 22 and lifts it from its seat. Simultaneously the open end of the passage 78 is closed so that the refrigerant fluid will flow from the chamber 12 into the chamber 14 and from thence through the passage 68 to the refrigeration chamber. When a sufficient volume of the refrigerating fluid has entered the refrigerating chamber to lower the temperature to the level desired, the sensing device will effect retraction of the bellows B. Retraction of the bellows will allow the spring 36 to predominate thereby closing the valve member 22. Simultaneously, the rod 50 will be forced away from the valve member 22 by the spring 60 so that the refrigeration chamber will be in communication with the exhaust passage 70 thus permitting exhaust of air within the refrigeration chamber as it expands with the rise in temperature in the refrigeration chamber.

Figure 4:
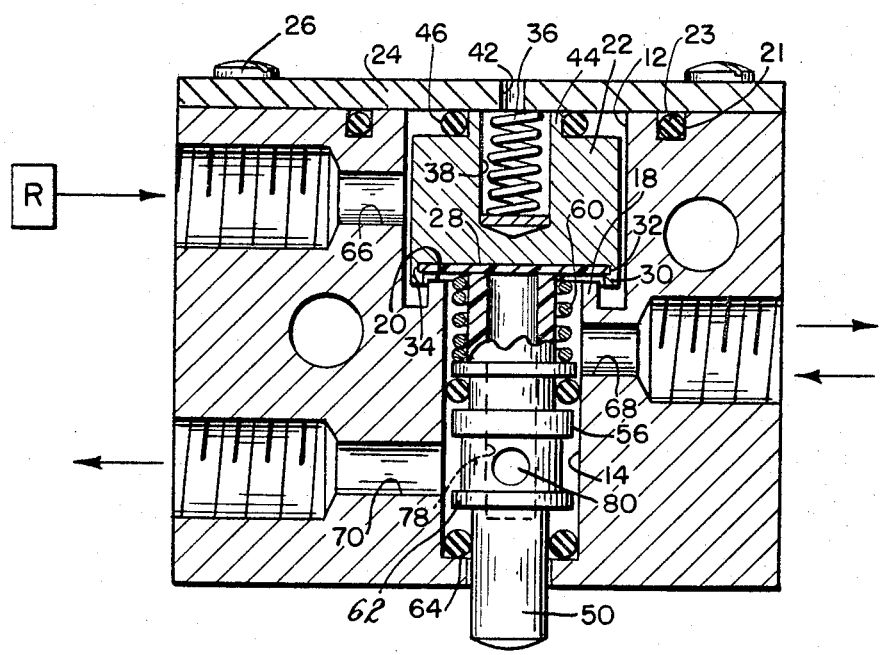
FIG. 4 is a view corresponding to FIG. 3, showing the valve inlet open.

FIG. 4 shows the valve in the open position with the valve member 22 raised from the seat 20 so that the refrigerating fluid flows from the chamber 12 into the chamber 14 and from thence through the passage 68 into the refrigerating chamber at which time the open end of the passage 78 is closed by contact with the face of the valve member 22 so that no flow can take place through this passage and the passages 80 and 70.

Figure 5:
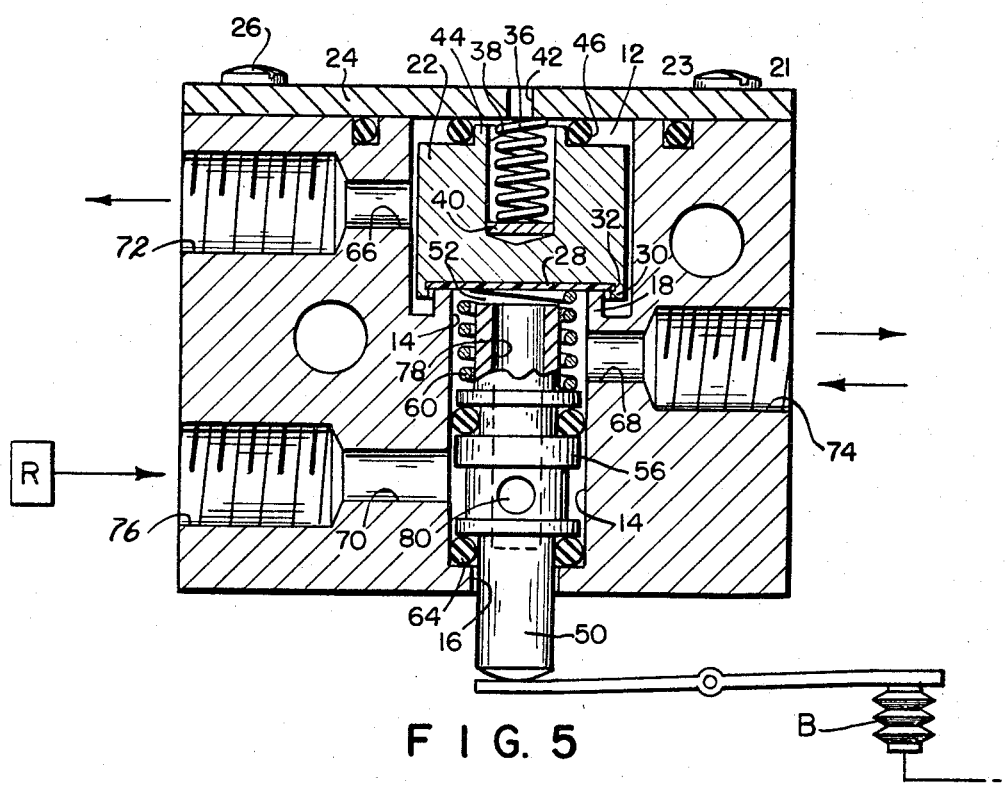
FIG. 5 is a vertical section of the valve used in its reverse-acting capacity with the valve inlet closed.
Figure 6:
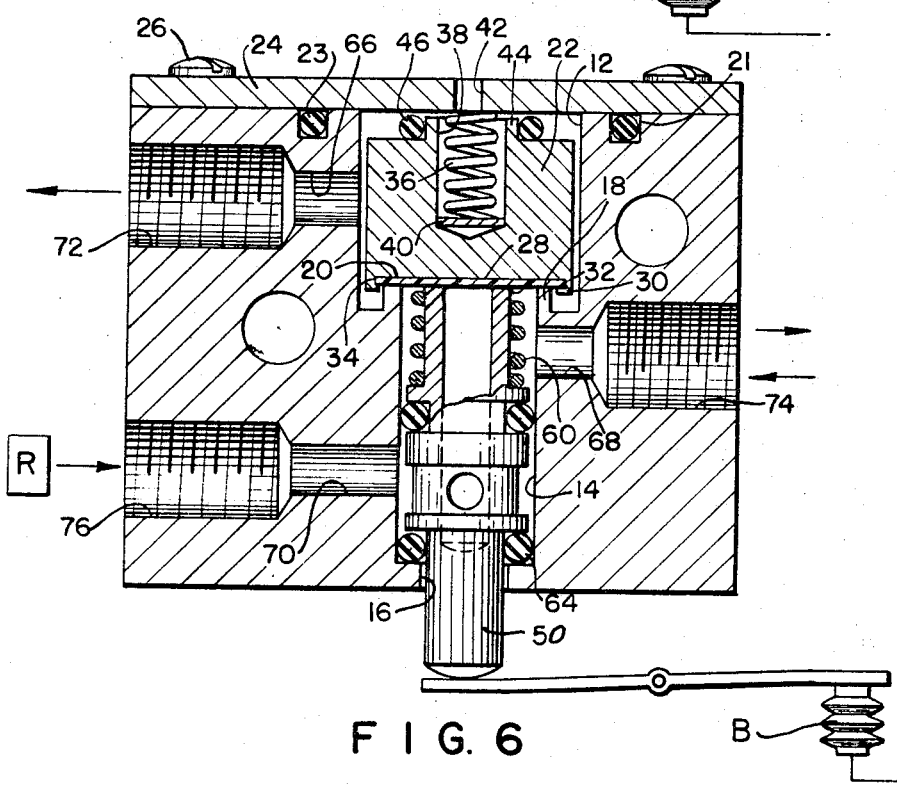
FIG. 6 is a view corresponding to FIG. 5, showing the valve inlet open.

The valve is adapted to be used in a reverse capacity, as illustrated in FIGS. 5 and 6, by connecting the source of refrigerant to the passage 70. The passage 68 will continue to be the inlet to the refrigeration chamber and the passage 66 will now be the exhaust. Assuming now that the refrigeration chamber is at a temperature higher than that desirable for maintaining proper refrigeration the sensing device S through expansion of the bellows B will permit the rod 50 to move from a position engaged with the valve member 22 to a position spaced therefrom as shown in FIG. 5. This will permit the refrigerant from a source R to enter the valve through the passage 70 and to pass therefrom through the passages 80, 78 and 68 to the refrigerating chamber C. At this time the valve member 22 will be seated so as to prevent flow from the chamber 14 to the chamber 12. When the temperature within the refrigeration chamber reaches the level desired, the rod 50 will be raised through contraction of the bellows B thus forcing its upper end against the valve member 22 and simultaneously closing the passage 78 so as to block the flow of refrigerating fluid and exhaust the refrigeration chamber through the passage 68, chamber 12 and exhaust passage 66.

The valve may also be used for maintaining a higher than atmospheric temperature in a chamber for a particular installation requiring maintaining a temperature, for example, above freezing. In such a case, steam, for example, may be introduced through the passage 66 of the valve, as shown in FIG. 4, to the chamber 12, and when the temperature in the chamber falls below a predetermined level the sensing device will actuate the rod 50 so as to raise the valve member from its seat and hence permit the steam to pass from the chamber 12 into the chamber 14 and from thence through the passage 68 into the chamber C. When the temperature within this chamber rises to the proper level the sensing device will operate to lower the rod 50 so as to close the valve member 22 and connect the chamber with the exhaust passage thereby allowing the chamber to cool. By supplying the steam to the passage 70 rather than the passage 66, the valve can be used in a reverse fashion in which the valve member 22 is seated and the steam flows from the passage 70 through the passages 80, 78, chamber 14 and the passage 68 to the chamber C being conditioned. When the temperature reaches the proper level, the rod will be raised to close the passage 78 and hence block further admission of steam and at the same time open the valve member 22 to connect the chamber C being conditioned with the exhaust passage 66.

Figure 7:
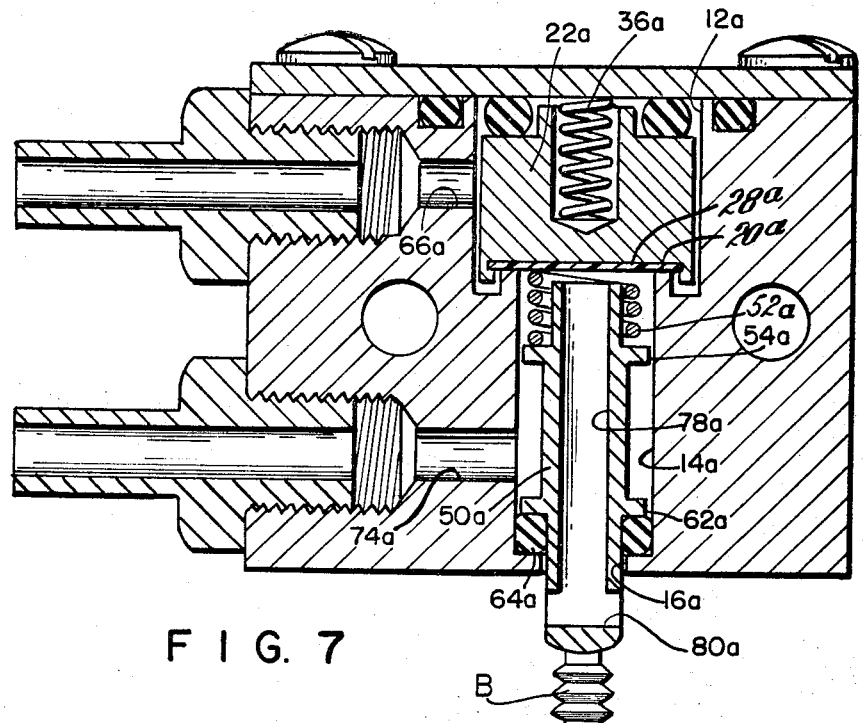
FIG. 7 is a vertical section through a modification of the valve.

A modification of the valve is shown in FIG. 7 which is of similar construction. The valve has a chamber 12a and chamber 14a in which are supported, respectively, a valve member 22a and a valve actuator 50a. The valve member 22a has a resilient face 28a and it is held against a seat 20a at the junction of the chamber 12a with the chamber 14a by a spring 36a. The valve actuator 50a is supported for axial movement in a hole 16a at the bottom of the chamber 14a and has on it axially spaced flanges 54a and 62a. A coiled spring 52a is mounted on the upper end of the actuator between the flange 54a and the face of the valve 22a and a yieldable O-ring 64a is mounted on the actuator between the flange 62a and the bottom of the chamber 14a. An inlet passage 66a provides for supplying refrigerating fluid to the chamber 12a and a passage 74a provides for conducting the fluid to the refrigeration chamber from the chamber 14a. In contrast to the previously described valve, the exhaust passage is provided for by the axial passage 78a in the actuator and a lateral passage 80a at the outer extremity of the passage 78a in that portion of the actuator rod which projects from the valve block.

In this form and as shown in FIG. 7, the valve is in the inoperative position in that the valve member 22a is closed so that no refrigerant is permitted to flow to the refrigeration chamber. At this time the valve rod 50a is retracted from the valve member 22a so that there is a passage from the refrigeration chamber C through the passage 74a, chamber 14a, passages 78a and 80a to the atmosphere. This is permitted by reason of the fact that there is no O-ring surrounding the valve rod between the passage 74a and the upper end of the rod as there was in the valve described above. When more refrigeration is called for by actuation of the sensing device, the rod 50a is pushed upwardly against the valve member 22a thus lifting it from its seat. This permits the refrigerating fluid to flow from the chamber 12a, into the chamber 14a and from thence through the passage 74a to the refrigeration chamber. At this time, flow is blocked through the passages 78a and 80a to the atmosphere.

This valve may be operated in a reverse capacity as described with respect to the valves above and that it also may be used for maintaining a predetermined temperature above freezing in a chamber rather than maintaining a refrigerating atmosphere.

It should be understood that the present disclosure is for the purpose of illustration only and that this invention includes all modifications and equivalents which fall within the scope of the appended claims.

I claim:

1. A miniature refrigeration valve comprising a valve body containing a chamber having portions of different diameter arranged tandemly with an annular valve seat at their junction, said portions constituting respectively a valve chamber and a valve actuator chamber, the valve chamber being open at one end and the valve actuator chamber being open at the other end, a cover secured to the valve body over the open end of the valve chamber, said valve body also containing passages, one of which enters the valve chamber and the other two of which enter the valve actuator chamber in axially spaced relation relative to the axis of the chambers, a valve block in the valve chamber, said valve block being of such transverse and longitudinal dimensions as to substantially fill the valve chamber, said valve block having at one end a flat surface for engagement with the annular valve seat and at its other end a hole concentric with the axis of the chamber for receiving a coiled spring, a coiled spring seated in the hole in compression with its ends bearing respectively against the bottom of the hole and the cover plate, said spring yieldably holding the valve against its seat, a resilient sealing ring supported around the hole in the valve block between the valve block and the cover plate which yieldably maintains a seal between said end of the valve block and the cover plate throughout movement of the valve block, said cover plate containing a vent hole in communication with said hole in the valve block, and a valve actuator in the valve actuator chamber movable in a direction to unseat the valve block, characterized in that one of the passages entering the actuator chamber constitutes an outlet passage through which refrigerant supplied to the valve enters the chamber to be refrigerated, and the other passage together with the passage entering the valve chamber are alternately adapted to be inlet or exhaust passages whereby the valve may be used reversely in response to movement of said actuator in the opposite direction in response to an increase in temperature in the chamber to admit refrigerant to the chamber.

2. A valve according to claim 1, wherein the valve actuator comprises a rod supported in the valve actuator chamber with one end adjacent the valve seat and the other end extending through the open end of the valve actuator chamber, said rod being axially movable in the valve actuator chamber in said one direction to unseat the valve block, and containing an axial passage part way through it from said one end toward the other, the one end of the passage being in communication with the valve actuation chamber, sealing means surrounding the rod, said sealing means being axially spaced so as to be situated at opposite sides of said other passage in the valve actuator chamber, said rod containing a lateral passage extending from the axial passage between said sealing means so as to be in communication with said other passage at all times throughout axial movement of said rod, and a coiled spring mounted between the rod and the valve block yieldably supporting them in spaced relation from each other, in which position the axial passage in the rod is in communication through said lateral passage with said other passage.

References Cited

UNITED STATES PATENTS

| | | | |
|---|---|---|---|
| 2,793,653 | 5/1957 | Payne | 137—627.5 X |
| 2,841,178 | 7/1958 | Schultz | 137—627.5 |
| 2,999,513 | 9/1961 | Oetiker | 137—627.5 X |
| 3,026,908 | 3/1962 | Blair | 137—627.5 |
| 3,107,693 | 10/1963 | Puster | 137—627.5 X |

FOREIGN PATENTS 971,505 9/1964 Great Britain.

CLARENCE R. GORDON, *Primary Examiner.*